United States Patent
Aymeloglu et al.

(10) Patent No.: US 8,494,941 B2
(45) Date of Patent: Jul. 23, 2013

(54) FEATURE-BASED SIMILARITY MEASURE FOR MARKET INSTRUMENTS

(75) Inventors: Andrew Aymeloglu, Palo Alto, CA (US); Kevin Simler, Fremont, CA (US); Garry Tan, Mountain View, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 1194 days.

(21) Appl. No.: 11/861,053

(22) Filed: Sep. 25, 2007

(65) Prior Publication Data

US 2009/0083195 A1   Mar. 26, 2009

(51) Int. Cl.
  *G06Q 40/00* (2012.01)
(52) U.S. Cl.
  USPC ............................... 705/36 R; 705/35; 705/37
(58) Field of Classification Search
  USPC .................. 705/35, 37, 36 R, 7; 707/603
  See application file for complete search history.

(56) References Cited

U.S. PATENT DOCUMENTS

| | | | |
|---|---|---|---|
| 6,289,338 B1 | 9/2001 | Stoffel et al. | |
| 6,640,231 B1 | 10/2003 | Andersen et al. | |
| 6,748,481 B1 | 6/2004 | Parry et al. | |
| 7,043,449 B1 | 5/2006 | Li et al. | |
| 7,181,423 B2 | 2/2007 | Blanchard et al. | |
| 7,273,192 B2 | 6/2007 | Stephenson et al. | |
| 7,240,330 B2 | 7/2007 | Fairweather | |
| 7,533,069 B2 | 5/2009 | Fairweather | |
| 7,590,582 B2 * | 9/2009 | Dunne | 705/36 R |
| 7,685,083 B2 | 3/2010 | Fairweather | |
| 2002/0026404 A1 * | 2/2002 | Thompson | 705/37 |
| 2002/0059126 A1 * | 5/2002 | Ricciardi | 705/36 |
| 2003/0172053 A1 | 9/2003 | Fairweather | |
| 2005/0075962 A1 * | 4/2005 | Dunne | 705/36 |
| 2007/0112714 A1 | 5/2007 | Fairweather | |
| 2007/0219882 A1 * | 9/2007 | May | 705/35 |
| 2008/0249957 A1 * | 10/2008 | Masuyama et al. | 705/36 R |
| 2009/0327157 A1 * | 12/2009 | Dunne | 705/36 R |

OTHER PUBLICATIONS

International Searching Authority "International Search Report", PCT/US2008/077244, dated Nov. 28, 2008, 9 pages.
Claims, PCT/US2008/077244, 8 pages.

* cited by examiner

*Primary Examiner* — Behrang Badii
(74) *Attorney, Agent, or Firm* — Hickman Palermo Truong Becker Bingham Wong LLP

(57) ABSTRACT

In one embodiment, first, second, and third inputs are received. The first input specifies a first market instrument and the second input specifies start and end dates of a first time series for the first market instrument. The third input specifies a feature set computer and the values of zero or more parameters thereof. A first feature set of the first market instrument is determined by applying the feature set computer to the first time series. A second feature set of a second market instrument is determined by applying the feature set computer to a second time series for the second market instrument, where the second time series is bounded by the start and end dates. The second feature set is correlated to the first feature set to determine a similarity score for the second market instrument, where the similarity score is a measure of the relationship between the second market instrument and the first market instrument.

16 Claims, 8 Drawing Sheets

FEATURE-BASED SIMILARITY MEASURE FOR MARKET INSTRUMENTS

FIELD OF THE INVENTION

The present disclosure generally relates to techniques for analyzing market instruments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditionally, the financial community has been interested in specific asset classes or economy sectors which have well defined characteristics and whose relationships to other asset classes and sectors are well known. Examples of specific asset classes with well-defined characteristics are stocks and bonds, which have relationships that are well known and widely used. Thus, the analysis tools presently used in the financial community are usually custom-made to perform specific analytical tasks based on well-known asset characteristics and relationships.

However, the financial community is becoming more and more interested in finding relationships and performing analysis across a wider variety of asset classes, economy sectors, countries, and markets. For example, with the rise of hedge funds this type of wider analysis is very useful in determining trading hypotheses that can be back-tested and used to determine the financial risks involved in particular trading strategies or other types of market exposure. While the data for different assets and economy sectors provided by stock markets and exchanges is becoming more and more accessible, the currently available analysis tools are not capable of performing accurate analysis over large data sets that involve wide variety of asset classes and other categories of interest.

The currently available analysis tools (for example, spreadsheet applications) are inadequate in allowing non-technical users to handle complex and technically challenging analysis of data sets that involve a large number of asset classes. Further, the currently available analysis tools are poorly suited to enabling different users to collaborate and share trading strategies and to exchange trading models at an abstraction level that is higher than the mere data to which formulas and statistical computations are applied.

The necessity of finding relationships among a wider variety of asset classes and the drawbacks of currently available analysis tools place at a serious disadvantage any organizations and individual analysts that may otherwise benefit from diverse, complex, and accurate analysis of market conditions that pertain to a wide variety of assets. For example, the ability to search through and determine similarities among a large number of assets and/or asset classes may be beneficial in finding relationships that may be existing between these assets and/or asset classes on the market.

SUMMARY

In one embodiment, a method comprises: receiving first input that specifies a first market instrument; receiving second input that specifies a start date and an end date of a first time series associated with the first market instrument; receiving third input that specifies a feature set computer and the values of zero or more parameters of the feature set computer; retrieving the first time series from a data repository; determining a first feature set associated with the first market instrument by applying the feature set computer to the first time series; retrieving, from the data repository, a second time series associated with a second market instrument, where the second time series is bounded by the start date and the end date; determining a second feature set associated with the second market instrument by applying the feature set computer to the second time series; determining a similarity score between the first feature set to the second feature set, where the similarity score is a measure of the relationship between the second market instrument and the first market instrument; and storing the similarity score in computer data storage.

In this embodiment, the first time series may be a first collection of pairs of timestamps and data values for a first metric of the first market instrument, and the second time series may be a second collection of pairs of timestamps and data values for a second metric of the second market instrument. The first metric of the first market instrument may be the same as or different from the second metric of the second market instrument. In this embodiment, the first feature set may comprise one or more features, where each feature is a set of data representing one or more characteristics of the first time series. The second feature set may comprise one or more features, where each feature is a set of data representing one or more characteristics of the second time series.

In this embodiment, the method may further comprise causing the first feature set to be displayed as an annotation overlaid on a graphical representation of the first time series in a graphical user interface in response to receiving the first input, the second input, and the third input.

In this embodiment, the method may be performed for each of a plurality of market instruments that includes the second instrument, where the method may further comprise: determining a plurality of feature sets respectively associated with the plurality of market instruments by applying the feature set computer to a plurality of time series respectively associated with the plurality of market instruments; and applying similarity determining logic to the plurality of feature sets and the first feature set to determine a plurality of similarity scores respectively associated with the plurality of market instruments.

In another embodiment, a graphical user interface (GUI) comprises: a plurality of GUI components configured to receive first user input that specifies a first market instrument, and second user input that specifies a start date and an end date of a first time series associated with the first market instrument; a first content pane configured to receive third user input that specifies a feature set computer and the values of zero or more parameters of the feature set computer; and a second content pane configured to display a first feature set associated with the first market instrument as an annotation overlaid on a graphical representation of the first time series. The first feature set is determined by applying the feature set computer to the first time series. One or more GUI components are configured to receive fourth user input that allows a user to correlate, based on the first feature set, the first market instrument with a collection of other market instruments and to generate a collection of corresponding similarity scores.

Other embodiments may comprise a computer system and one or more machine-readable media operable to provide the foregoing graphical user interface and/or to perform or cause the performance of the foregoing method steps.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
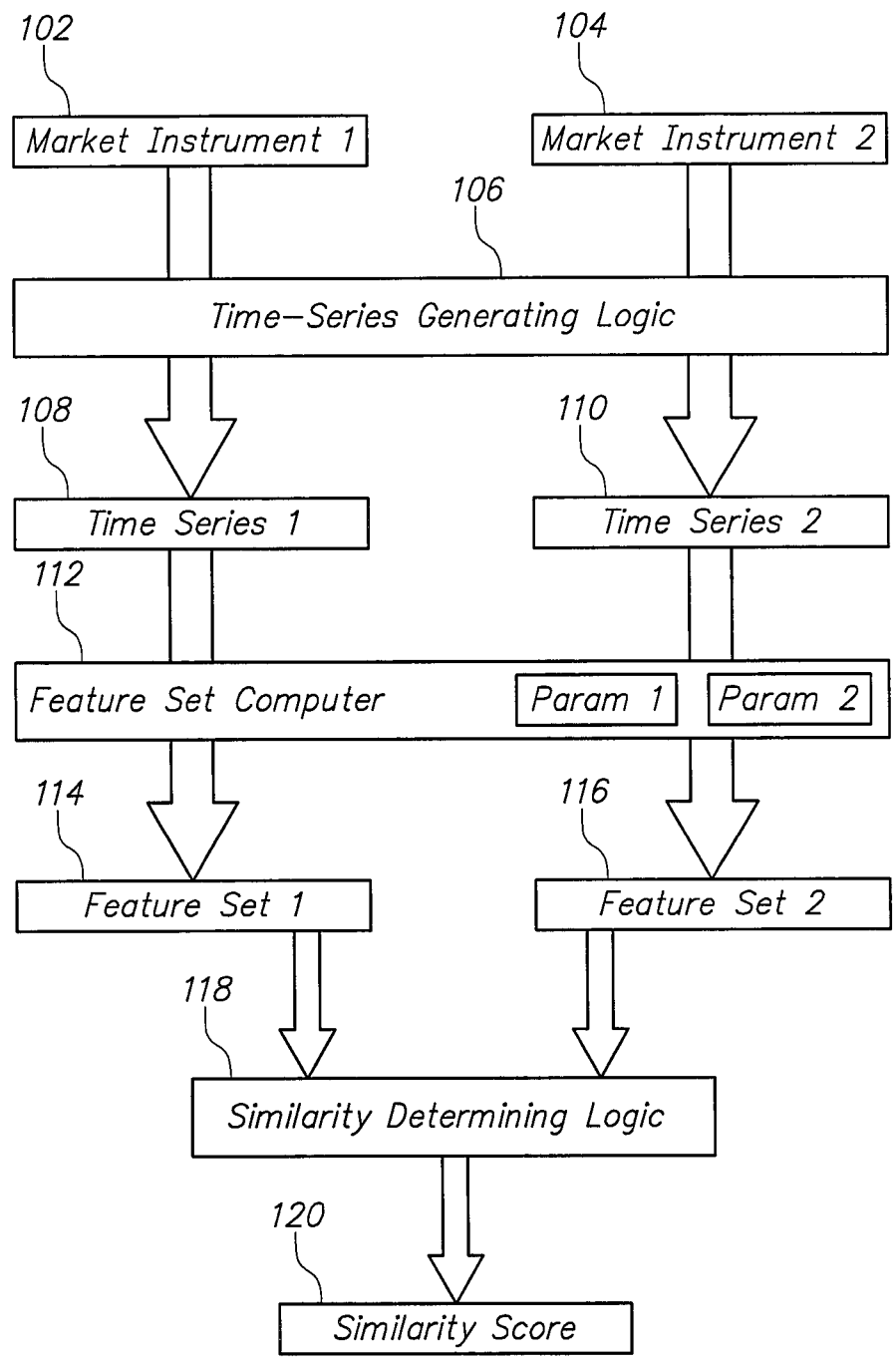
FIG. 1A is a block diagram illustrating a technique for computing a feature-based similarity score for the time series of a particular metric of two market instruments according to an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Feature-Based Similarity Scores for Market Instruments

The techniques described in the present disclosure provide for determining correlations between market instruments based on user-specifiable features that existed for time series of the market instruments during a user-specified time period.

As used herein, "market instrument" (or just "instrument") refers to a tradable element that has some kind of value. For example, any stocks and bonds and derivatives thereof (e.g. stock options, bond futures) may be represented as instruments that can be traded on stock markets and/or exchanges. Instruments may also represent various types of commodities, such as for example, crude oil, natural gas, or gold, and may be traded on commodities markets and exchanges. Instruments may also represent various financial assets and any derivatives thereof, for example, currencies, securities, loans, and various financial derivatives such as futures, options, swaps, and exotic derivatives. The examples of instruments provided herein are not in any sense limiting and are to be regarded in an illustrative rather than a restrictive sense.

As used herein, "metric" refers to a function which operates on a market instrument to produce and/or identify a time series associated with the market instrument. For example, the metrics of a stock instrument include, but are not limited to, opening price, closing price, volatility, volume, market capitalization, relative strength index (RSI), dividend yield, 52-week low-high range, price-per-share to earnings-per-share (P/E) ratio and other valuation ratios, various profitability margins, and per-share earnings. In general, the types of metrics available for an instrument would depend on the particular type of the instrument.

As used herein, "time series" refers to a mapping from timestamps to data values. The data values in a time series are measured and/or recorded at date-time points that are represented by the timestamps. For example, a time series may comprise a set of closing price values of a stock recorded at the close of a market on successive days, or a set of intraday bond yields that occurred at successive hours in a trading day. The values in a time series may be stored in one or more data repositories of any type including, without limitation, relational and/or object-oriented databases, data warehouses, directories, data files, and any other storage structures operable to store data.

As used herein, "feature" refers to a set of data representing a particular aspect or a characteristic of a time series. For example, a trending feature may represent an up (or a down) trend that may exist with respect to the closing price of a stock instrument within some time period. In another example, a peaks/troughs feature may represent a peak (or a trough) that may exist for the stock price of an instrument on a specific date. In another example, a big-moves feature may represent a large positive (or negative) move in the time series of a stock instrument, where "large" may be determined on an absolute basis, a percentage basis, or relative to the instrument's volatility. As used herein, a "feature set" refers to a collection of features that are associated with the same time series. For example, a trending feature set may include all up trends and down trends of a time series of the closing price of a particular market instrument. In another example, a peaks/troughs feature set may include all peaks and all troughs for the time series of the closing price of a particular market instrument. In another example, a big moves feature set may include all large positive and negative moves for the time series of the closing price of a particular market instrument.

As used herein, "feature set computer" refers to a computer-implemented component or logic which, when provided with a time series as input, is operable to compute a feature set associated with the input time series. A feature set computer may include zero or more parameters, the values of which are used when the feature set computer is applied to a time series to determine a particular feature set. For example, a trending feature set computer may receive as input the time series of the closing price of a particular market instrument, and may return all up trends and down trends in the time series which detail what it means for a time series to be considered "trending". For example, a feature set computer may be implemented without limitation as a routine, a procedure, a function, an object-oriented method, or as any construct comprising instructions that may be executed by computer processors.

As described herein, a user may specify a feature set computer and the values of zero or more parameters of the feature set computer. The zero or more parameters are part of the feature set computer to which they pertain. Setting the parameters of a feature set computer to different values causes the feature set computer to "pick out" different features in the time series on which it is operating. A feature set computer and the user-specifiable parameters thereof may be referred to as a "model". To determine the features that existed for an instrument during a specified period of time, the model may be applied to a time series for a metric of the instrument where the time series is bounded by that period of time. For example, a user may specify a trending feature set computer and the values of duration and precision parameters thereof in order to determine (or "pick out") a trend in the closing price of a particular stock instrument. To determine whether the particular stock instrument was trending up, down, or not at all during a time period, the trending feature set computer may be applied to a time series for the closing price of the instrument, where the time series is bounded by the start and end dates identifying that time period.

FIG. 1A is a block diagram illustrating a technique for computing a feature-based similarity score between two market instruments according to an example embodiment.

Market instruments 102 and 104 are provided as input to time-series generating logic 106. In various embodiments, market instruments 102 and 104 may be provided to time-series generating logic 106 concurrently or sequentially in any order.

Time-series generating logic 106 may be implemented as a set of program instructions which, when executed by one or more processors, are operable to retrieve from a data repository or generate a time series for a particular metric of a market instrument that is specified as input. For example, time-series generating logic 106 may be implemented without limitation as a routine, a procedure, a function, an object-oriented method, or as any construct comprising instructions that may be executed by computer processors.

In response to receiving a market instrument (such as market instrument 102 or 104) or an identifier thereof, time-series generating logic 106 is operable to generate a time series for that market instrument. Time-series generating logic 106 may be operable to use a default metric and/or to receive an identifier of the particular metric from a user. For example, in response to receiving an identifier of market instrument 102, time-series generating logic 106 generates time series 108; similarly, in response to receiving an identifier of market instrument 104, time-series generating logic 106 generates time series 110. When generated, time series 108 and 110 are passed as input to feature set computer 112.

Feature set computer 112 is operable to determine and generate, from a time series, the feature set of this time series for a particular type of features (e.g. trending feature set, peaks/troughs feature set, etc.) Feature set computer 112 may be also configured to receive (and/or use default) values of zero or more input parameters that cause the feature set computer to determine (or "pick out") different features in the time series on which it is operating. For example, in response to receiving time series 108, feature set computer 112 generates the feature set 114 that is associated with time series 108; in response to receiving time series 110, feature set computer 112 generates feature set 116 which is associated with time series 110. When generated, feature sets 114 and 116 are passed as input to similarity determining logic 118.

Similarity determining logic 118 is operable to compute a similarity score according to a particular algorithm that may be specific to a particular type of feature set. Similarity determining logic 118 may be implemented as a set of program instructions which, when executed by one or more processors, are operable to compute a similarity score for two or more time series based on two or more feature sets corresponding to the two or more time series. For example, similarity determining logic 118 may be implemented without limitation as a routine, a procedure, a function, an object-oriented method, or as any construct comprising instructions that may be executed by computer processors. According to the techniques described herein, similarity determining logic 118 is operable to receive feature sets 114 and 116, and to compute similarity score 120, which is a measure of the relationship between time series 108 and 110 (and, consequently, between the corresponding market instruments 102 and 104).

In some embodiments, the techniques for determining feature-based similarity scores described herein may be implemented as a client-server application. In these embodiments, a client component of the application may provide a graphical user interface that is configured to receive user input and to display results to a user. A server component of the application may be communicatively connected to a data repository and may be operable to derive time series based on user input, which selects various market instruments and metrics thereof and which specifies one or more feature set computers and parameters thereof for determining one or more features of interest. In these embodiments, computing the similarity scores for one or more market instruments may be performed by the client component, by the server component, and/or by a combination of the client and server components of the client-server application. For example, with respect to the components depicted in FIG. 1A, in one embodiment a server component of a client-server application may provide time-series generating logic 106, feature set computer 112, and similarity determining logic 118, and a client component may provide a graphical user interface through which a user may specify the market instruments 102 and 104 and through which the user may receive the resulting similarity score 120.

In some embodiments, the techniques described herein may be implemented as a standalone application that is executing on a distributed or a non-distributed computer system. In other embodiments, the techniques described herein may be implemented as web-based services operating in a Service-Oriented Architecture (SOA) framework. Thus, the techniques described herein are not limited to implementation in any specific application paradigm or on any specific computer system, and for this reason the example embodiments described herein are to be regarded as in an illustrative rather than a restrictive sense.

Figure 1B:
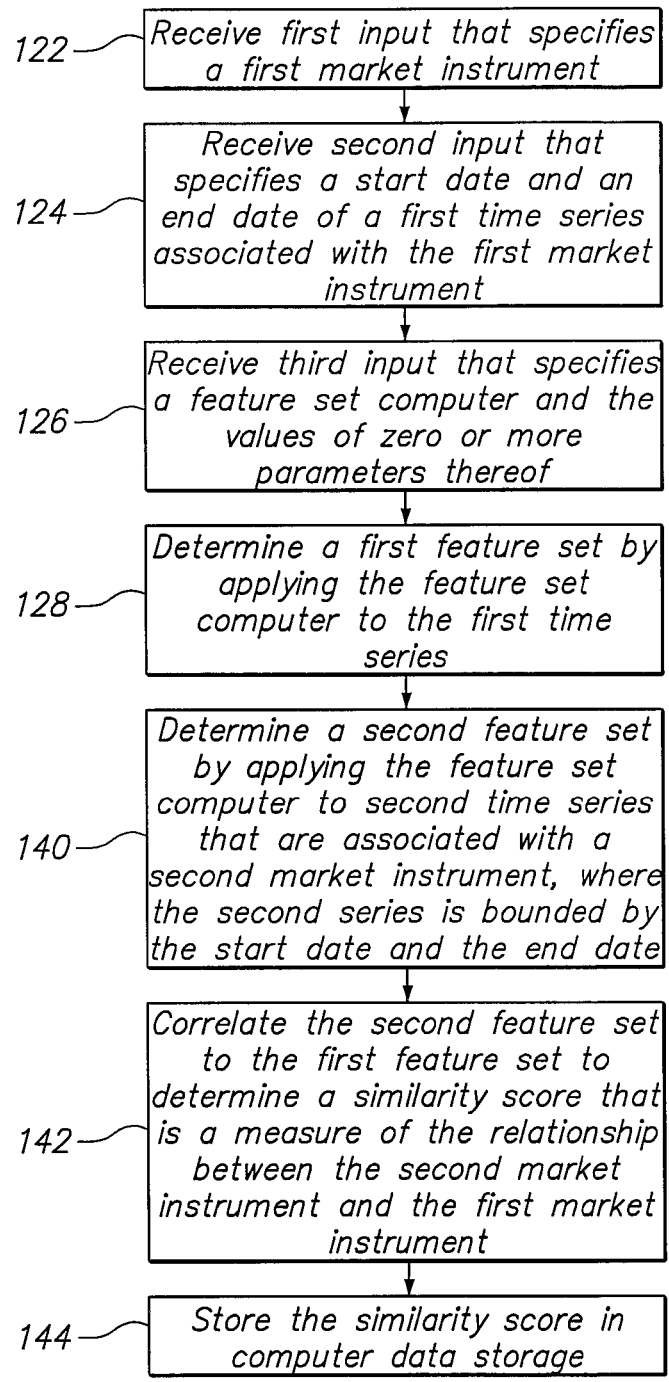
FIG. 1B illustrates an example method of computing similarity scores for market instruments based on user-specifiable features of time series of the market instruments.

FIG. 1B illustrates a method of computing similarity scores for market instruments according to an example embodiment.

In step 122, first input that specifies a primary market instrument is received from a user. As used herein, "primary instrument" refers to an instrument with respect to which a user specifies a feature set computer and the values of zero or more parameters thereof. The first input may also specify a metric for the primary instrument.

In step 124, second input may be received from a user. The second input specifies a start date and an end date of a first time series associated with the primary instrument. As used herein, a "date" may be a datetime value representing a point in time, where the datetime value may be represented by various parts including, without limitation, year, month, day, hour, minute, and seconds parts. For example, the second input may specify Jun. 28, 2006 as the start date and Dec. 8, 2006 as the end date of the time series.

In step 126, third input is received from a user. The third input specifies a feature set computer and the values of zero or more parameters thereof. The feature set computer is operable to determine whether specific features exist in a specific time series of the primary instrument.

After receiving from the user input that specifies a time period, the primary instrument, and an instrument metric, a time series for that metric of the primary instrument is retrieved from a data repository or is generated based on data values retrieved from the data repository. The time series may be stored in any logical data structure, such as, for example, an array. In addition, the time series may be filtered to include only data values that are associated with timestamps within the time period specified in the user input.

After retrieving the time series for the primary instrument, in step 128 a primary feature set is determined by applying the feature set computer to the time series of the primary instrument. For example, if the user input specified the values for duration and precision parameters of a trending feature set computer with respect to the closing price of the primary instrument, the trending feature set computer would examine the time series and determine the up-trends and down-trends (if any) which existed for the closing price of the primary instrument during the user-specified time period and which satisfy the values of the duration and precision parameters specified by the user. A set of data, which represents any determined up-trends, down-trends, and/or no-trends of the closing price of the primary instrument, is recorded as the primary feature set for the primary instrument.

Thereafter, a time series associated with a candidate instrument is retrieved from the data repository or is generated based on data values retrieved from the data repository. As used herein, "candidate instrument" refers to an instrument for which the similarity score with the primary instrument would be determined based on the user-specified feature set computer. The time series of the candidate instrument may be stored in any logical data structure, such as, for example, an array. In addition, the time series of the candidate instrument may be filtered to include only data values that are associated with timestamps within the time period identified by the user-specified start date and end date.

Similarly to determining the primary feature set of the primary instrument, in step 140 a candidate feature set is determined by applying the same feature set computer to the time series of the candidate instrument. For example, the trending feature set computer would examine the time series and determine the up-trends and down-trends (if any) which existed for the closing price of the candidate instrument during the user-specified time period and which satisfy the values of the duration and precision parameters specified by the user. A set of data, which represents any determined up-trends, down-trends, and/or no-trends of the closing price of the primary instrument, is recorded as the candidate feature set for the candidate instrument.

In step 142, the candidate feature set is correlated to the primary feature set in order to determine a similarity score that indicates the degree to which the candidate instrument is related to the primary instrument.

As used herein, "similarity score" refers to a measure of some relationship or correlation between two instruments. According to the techniques described herein, a similarity score may be expressed as a real number value between the values of "−1" and "+1", where a value close to "0" suggests poor correlation, a value of "−1" suggests inverse correlation, and a value of "+1" suggests positive correlation. In some embodiments, the similarity score may computed by pairing up corresponding values in the data sets that represent the candidate and primary feature sets, multiplying each pair together, and then averaging the resulting products. In other embodiments, the similarity score may be determined by performing regression analysis based on paired sets of data.

In step 144, the computed similarity score is stored in computer data storage in association with the candidate instrument. As used herein, "computer data storage" refers to a data structure, which is operable to store data and which may be accessed by a computing device such as, for example, a computer system. A computer data storage may be physically stored in any volatile and/or non-volatile machine-readable medium. According to the techniques described herein, in some embodiments a computer data storage for storing similarity scores may be implemented in a storage device that includes persistent, non-volatile media such as optical or electromagnetic disks. In some embodiments, a computer data storage for storing similarity scores may be implemented in a storage device that includes volatile media such as RAM or other dynamic memory. The techniques described herein are not limited to storing similarity scores in any particular type of computer data storage or on any particular type of machine-readable medium.

Figure 1C:
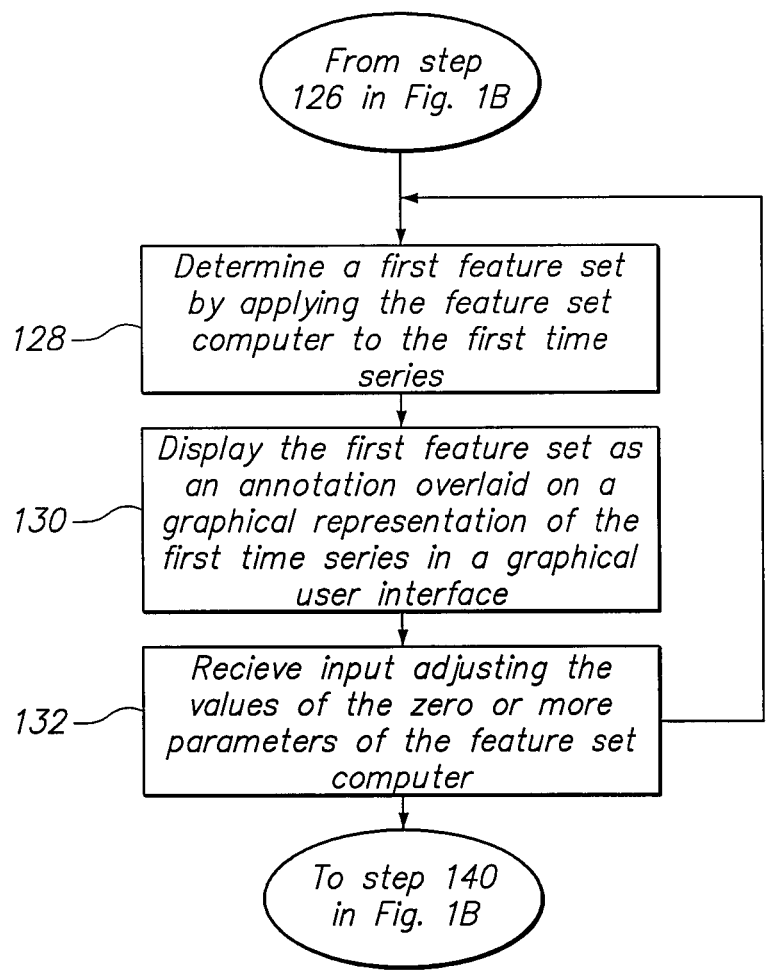
FIG. 1C illustrates an example method of repeatedly receiving user input that adjusts the features of a time series of a market instrument and displaying the adjusted features in a graphical user interface.

FIG. 1C illustrates an example method of repeatedly receiving user input that adjusts the features of a time series of a market instrument, and displaying the adjusted features in a graphical user interface.

After receiving user input that specifies a primary instrument, a feature set computer, and the values of zero or more parameters of the feature set computer, and after retrieving or generating the time series for the primary instrument, in step 128 a primary feature set is determined by applying the feature set computer to the time series of the primary instrument.

In step 130, the primary feature set is displayed in a graphical user interface as an annotation overlaid on a graphical representation of the time series of the primary instrument. For example, the graphical user interface may display a chart on which the time series is plotted as an unbroken line. Other examples of graphical representations for the time series of the primary instrument include, but are not limited to, open-high-low-close (OHLC) bars and candle bars. The annotation that represents the primary feature set may be any graphical object that is suitable for indicating characteristics of a time series; examples of annotations include, but are not limited to, dots, lines, rectangle boxes, circles, and other graphical objects having various shapes and colors.

For example, suppose that a user input specifies a time series of the closing price of the primary instrument. The time series may be plotted on a chart in a graphical user interface as an unbroken time series line, where the horizontal axis of the chart is a time axis and the vertical axis of the chart reflects the magnitude of the data values included in the time series. According to the techniques described herein, the primary feature set representing trends may be determined by applying a trending feature set computer (as parameterized by the user-specified values of duration and precision parameters) to the time series. Any trends represented by the primary feature set may then be displayed on the chart in the graphical user interface as sloping trend lines that are overlaid on the time series line.

In step 132, user input is received that adjusts the annotations of the primary feature set displayed in the graphical user interface. For example, the user may adjust the values of duration and precision parameters of a trending feature set computer in order to determine the exact trends that the user is interested in for the closing price of the primary instrument. In response, step 128 is performed again to determine the adjusted feature set of the primary instrument, and step 130 is performed to display the adjusted feature set as a new annotation overlaid on the graphical representation of the time series in the graphical user interface. By iterating over steps 128, 130, and 132, the user is able to better understand the relationship between the parameters and the resulting features. By providing visual feedback in response to user adjustments to parameters, the techniques described herein aid the user in specifying the exact features that the user is interested in.

After the user has specified parameter values that cause a feature set computer to compute the exact features of interest, the similarity scores for one or more candidate instruments may be determined based on these features by, for example, performing steps 140 to 144 in FIG. 1A.

II. Computing Similarity Scores for a Plurality of Market Instruments

According to the techniques described herein, similarity scores for a plurality of candidate instruments may be computed as part of searching for instruments that are correlated to a primary instrument with respect to one or more user-specified features within a user-specified time period. In some embodiments, the set of candidate instruments for which similarity scores are computed may be selected by a user.

Figure 2:
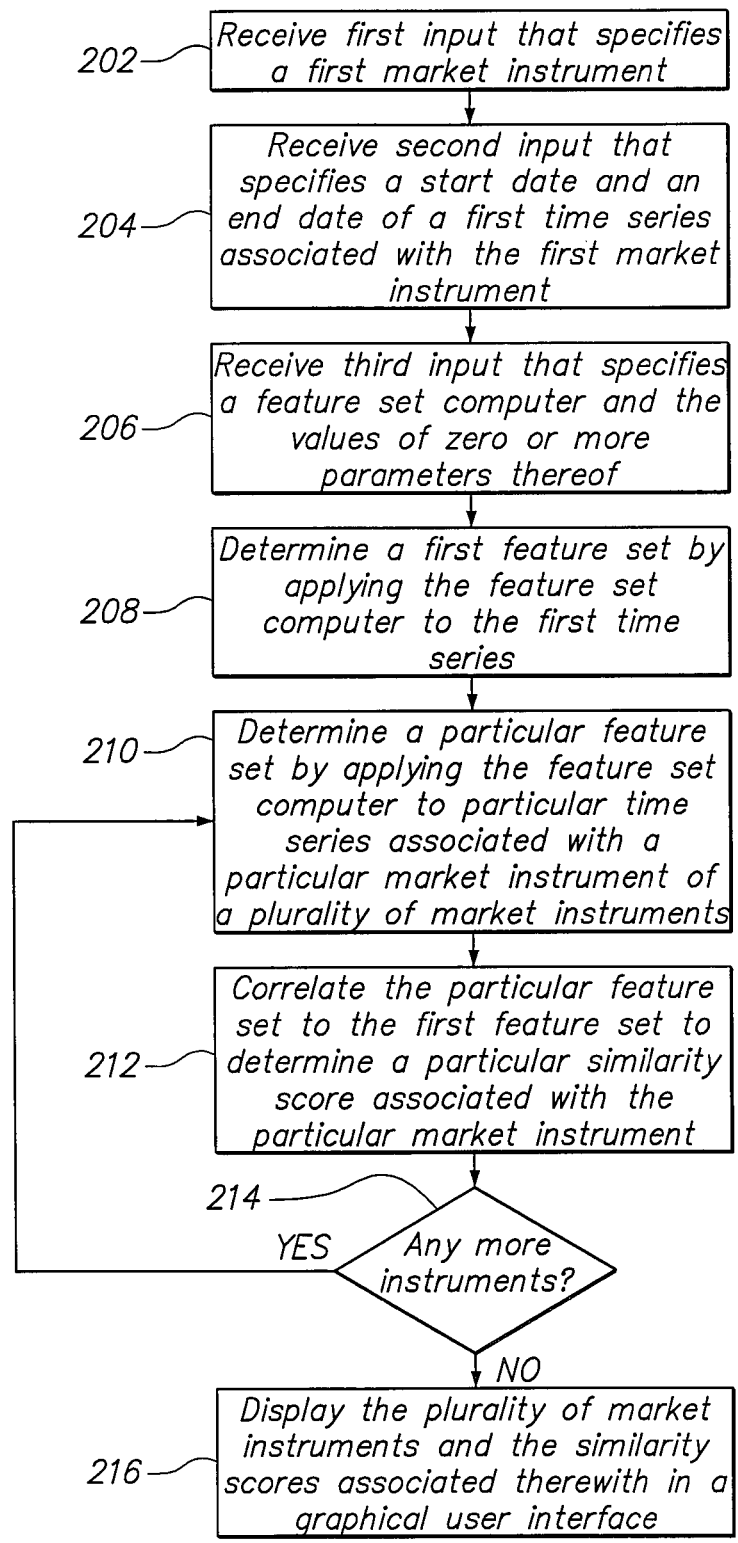
FIG. 2 illustrates a method of correlating a plurality of market instruments to a user-selected market instrument based on user-specifiable time series features.

FIG. 2 illustrates a method of computing a similarity score for each of a plurality of market instruments with a user-selected primary instrument based on user-specified features.

In step 202, first input that specifies a primary instrument is received from a user. In step 204, second input is received from a user. The second input specifies a start date and an end date of a first time series associated with the primary instrument. In step 206, third input is received from a user. The third input specifies a feature set computer the values of zero or more parameters of the feature set computer. Steps 202, 204, and 206 may be performed in different order or simultaneously depending on the particular implementation of the techniques described herein.

After receiving user input that specifies a time period, the primary instrument, and an instrument metric, the metric is applied to the primary instrument to retrieve or generate a time series. The time series is filtered to include only data values that were recorded during the time period specified in the user input.

After retrieving the time series for the primary instrument, in step 208 a primary feature set is determined by applying the feature set computer to the time series of the primary instrument.

Thereafter, a time series associated with a particular candidate instrument, of a plurality of candidate instruments, is retrieved from the data repository. The time series of the particular candidate instrument may be filtered to include only data values that are associated with timestamps within the time period identified by the user-specified start date and end date.

In step 210, a particular candidate feature set is determined by applying the feature set computer to the time series of the particular candidate instrument. The particular candidate feature set includes one or more sets of data, which represents one or more features that are determined for the particular candidate instrument during the time period specified by the user.

In step 212, the particular candidate feature set is correlated to the primary feature set in order to determine a similarity score that indicates the degree to which the particular candidate instrument is related to the primary instrument. The computed similarity score is stored in computer data storage in association with the particular candidate instrument.

In step 214, a determination is made whether there are any more instruments in the plurality of candidate instruments. If the plurality of candidate instruments includes more instruments, then step 210 is performed for each such candidate instrument to determine a particular feature set for that instrument, and step 212 is performed to compute a similarity score for that instrument and to store the computed similarity score.

If in step 214 it is determined that similarity scores have been computed for all candidate instruments in the plurality of candidate instruments, then in step 216 the plurality of candidate instruments and their associated similarity scores are displayed in a graphical user interface. In one embodiment, a histogram may be generated based on the plurality of candidate instruments and on the respective plurality of similarity scores associated therewith. For example, the histogram may group the plurality of candidate instruments in different histogram buckets, where each bucket is associated with a particular range of similarity score values, and where the height of each bucket indicates the number of candidate instruments included in that bucket. In another embodiment, a table may be generated based on the plurality of candidate instruments where each record in the table includes a particular candidate instrument and the similarity score computed for that candidate instrument.

III. First Example Technique for Computing Feature-Based Similarity Scores

The techniques described herein provide for computing similarity scores by comparing features specified for a time series of a primary instrument to features of one or more time series of one or more candidate instruments. In an illustrative example, the features of the primary instrument and the features of the candidate instruments may be determined for the same user-specified time period and for the same time series metric.

According to one technique for computing feature-based similarity scores, the set of data representing a specific feature set for the primary instrument is mapped to a primary array of integer values. The set of data representing the same specific feature set for a candidate instrument is similarly mapped to a candidate array of integer values. The values in the primary array and in the candidate array are drawn from a finite set of values, where each value in the finite set represents a particular characteristic of the specific features for the primary and candidate instruments. The corresponding values in the primary array and the candidate array are multiplied, and the resulting products are then averaged. The result of the averaging operation is a similarity score that measures the degree of the relationship between the primary instrument and the candidate instrument with respect to the specific feature during the user-specified time period.

Figure 3A:
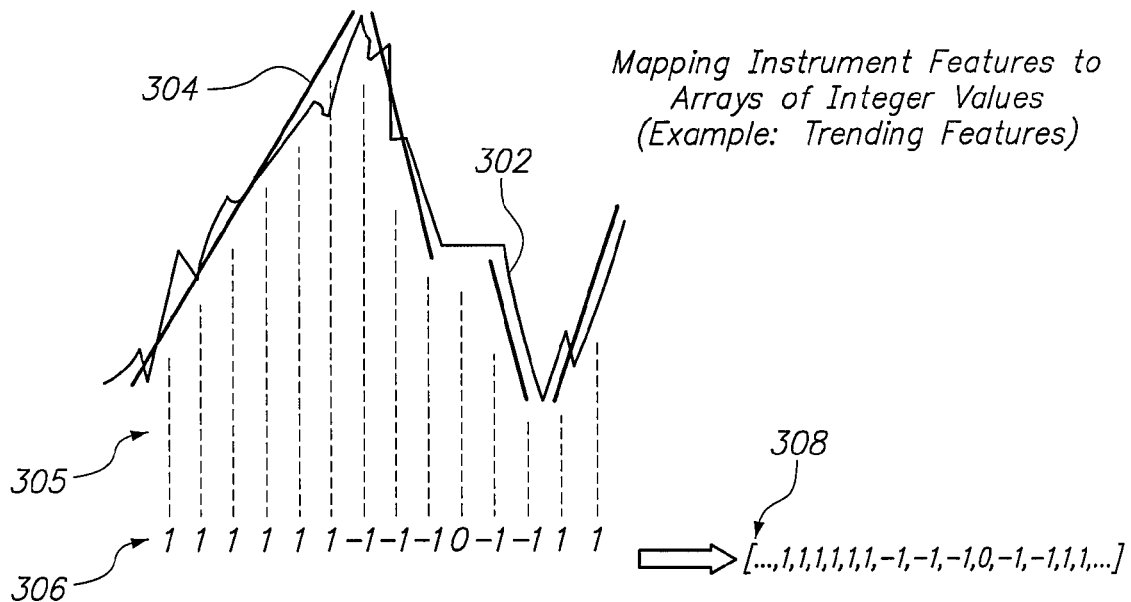
FIG. 3A illustrates an example technique for mapping the features of a time series of market instrument to an array that is used to compute similarity scores.

FIG. 3A illustrates an example technique for mapping a feature of a market instrument to an array that is used to compute similarity scores. The example technique of FIG. 3A may be performed by a similarity determining logic (such as similarity determining logic 118 illustrated in FIG. 1A) that operates on a trending feature set, which is generated by a trending feature set computer based on a time series of the closing price of a market instrument. The trending feature set computer may include a duration parameter and a precision parameter, where a duration parameter value may specify the minimum number of days in a trend and a precision parameter value may specify the degree to which the underlying time series must line up with the trend line.

As illustrated in FIG. 3A, the time series of the closing price of the market instrument is plotted on a chart as time series line 302. The trending feature set for the closing price of the market instrument includes trends 304 that are plotted on the chart of FIG. 3A as sloping lines. In the example of FIG. 3A, the trending feature set includes two up-trends and two down-trends. The trending feature set of the market instrument also includes a no-trend between the two down-trends. It is noted that implementing the mapping technique described with respect to FIG. 3A does not require plotting the time series and the trends on any chart. The chart in FIG. 3A is provided for illustrative purposes only.

According to the mapping technique illustrated in FIG. 3A, a similarity determining logic would include in the resulting array 308 one value for each data point 305 that is included in the set of data representing the trending feature set of the closing price of the market instrument. The similarity determining logic may determine the number of data points based on a user-specified time period—for example, one data point for each market day between a start date and an end date specified by the user. Data points 305 may be mapped to sequence of values 306 according to the following rules:

(1) the value of "+1" is recorded in sequence 306 for each data point at which the time series of the closing price of the market instrument is trending up;

(2) the value of "0" is recorded in sequence 306 for each data point at which the time series of the closing price of the market instrument is not trending; and (3) the value of "−1" is recorded in sequence 306 for each data point at which the time series of the closing price of the market instrument is trending down.

After each data point 305 is mapped to a value in sequence 306, the similarity determining logic may store the values in sequence 306 as array 308 that can be used in the computation of a similarity score.

Using the mapping technique illustrated in FIG. 3A, a similarity determining logic may determine a primary array and candidate array, where the primary array maps the trending feature set of a primary instrument and the candidate array maps the trending feature set of the candidate array. The corresponding values in the primary array and the candidate array are multiplied, and the resulting products are then averaged. The result of the averaging operation is a similarity score that reflects the degree of relationship between the primary array and the candidate array.

In an example embodiment, the computed similarity score would be a real number value between "−1" and "+1". A value close to "−1" would indicate that the primary instrument and the candidate instrument are inversely correlated. For example, on most days on which the primary instrument exhibits the specific feature (e.g. an up-trend), the candidate instrument would tend to exhibit the opposite of the specific feature (e.g. a down-trend). A value close to "0" indicates that the primary instrument and the candidate instrument are not correlated. A value close to "+1" would indicate that the primary instrument and the candidate instrument are positively correlated. For example, on most days on which the primary instrument exhibits a specific feature (e.g. an up-trend), the candidate instrument would also tend to exhibit that same specific feature (e.g. an up-trend).

While the mapping technique illustrated in FIG. 3A is described with respect to a finite set of integer values that includes the values (−1, 0, +1), it is noted that this technique is not limited to any particular set that includes any particular values. For example, the finite set of integer values used for mapping the data set of a feature to an array may include more than three values and/or values that are different than "−1", "0", and "+1". Accordingly, the specific details of the technique illustrated in FIG. 3A are to be regarded in an illustrative rather than a restrictive sense.

The mapping technique illustrated in FIG. 3A is not limited to being implemented only for a trending feature. For example, a similarity determining logic may use this mapping technique to map the time series of other instrument metrics including, but not limited to, the relative strength index (RSI) of a market instrument, the volatility (implied and/or historical) of a market instrument, and the market capitalization of a market instrument. Further, a similarity determining logic may use this mapping technique to map other instrument features, for example, an above/below feature which represents the fluctuation of a time series of an instrument metric above or below some threshold value. Accordingly, the mapping technique illustrated in FIG. 3A is to be regarded in an illustrative rather than a restrictive sense.

IV. Second Example Technique for Computing Feature-Based Similarity Scores

According to one technique for computing similarity scores by comparing instrument features, a similarity determining logic may map the set of data representing a specific feature set for the primary instrument to a primary array of real number values. The similarity determining logic may also map the set of data representing a feature set of the same type for a candidate instrument to a candidate array of real number values. The values in the primary array and in the candidate array are drawn from a range of values, where each value in the range represents some characteristic of the specific features for the primary and candidate instruments.

Figure 3B:
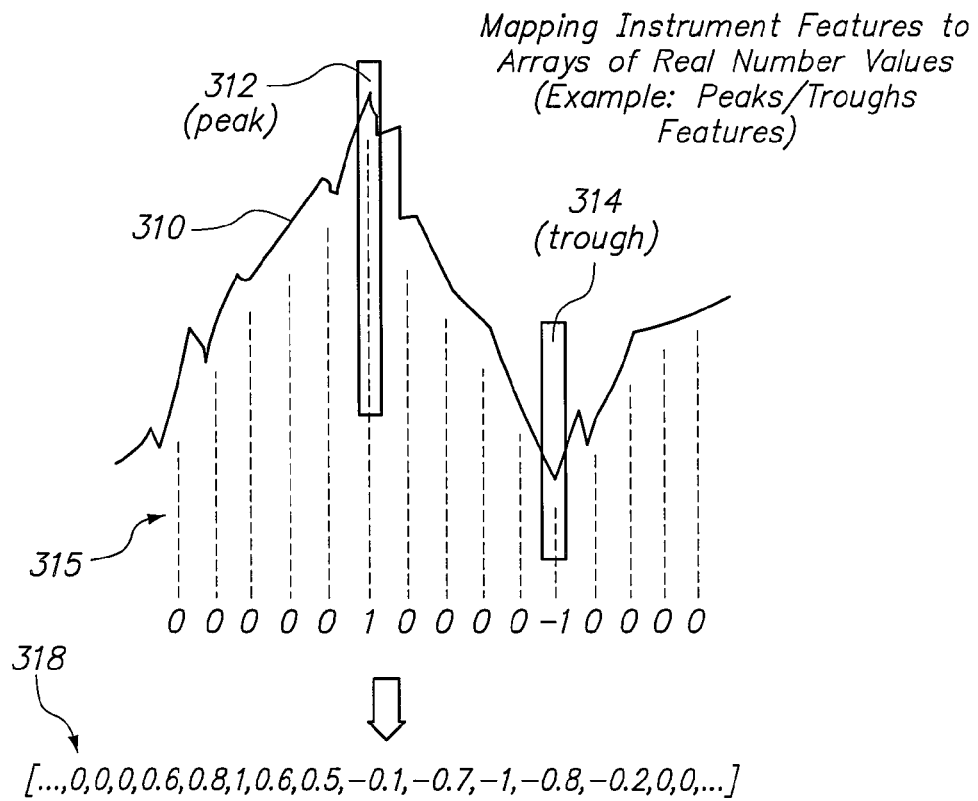
FIG. 3B illustrates another example technique for mapping the features of a time series of a market instrument to an array that is used to compute similarity scores.

FIG. 3B illustrates an example technique for mapping a feature of a market instrument to an array that is used to compute similarity scores. The example technique of FIG. 3B may be performed by similarity determining logic that uses a peaks/troughs feature set generated by a peaks/troughs feature set computer based on a time series of the closing price of a market instrument, where at a peak the value of the closing price changes from ascending to descending, and at a trough the value of the closing price changes from descending to ascending. The peaks/troughs feature set computer may include a duration parameter and a height parameter, where a duration parameter value may specify the maximum duration (e.g. in number of days) of a peak or a trough, and a height parameter value may specify the minimum delta (or difference) needed to be considered a peak value or a trough value.

As illustrated in FIG. 3B, the time series of the closing price of the market instrument is plotted on a chart as time series line 310. In the example of FIG. 3B, the peaks/troughs feature set for the closing price of the market instrument includes peak 312 and trough 314, which are plotted on the chart of FIG. 3A as vertical bars. It is noted that implementing the mapping technique described with respect to FIG. 3B does not require plotting the time series and the peaks/troughs on any chart. The chart in FIG. 3B is provided for illustrative purposes only.

According to the mapping technique illustrated in FIG. 3B, the similarity determining logic would include in the resulting array 318 one value for each data point 315 that is included in the set of data representing the peaks/troughs feature of the closing price of the market instrument. The similarity determining logic may determine the number of data points based on a user-specified time period—for example, one data point for each market day between a start date and an end date specified by the user. As an example, data points 315 may form an integer sequence with values assigned based on the following rules:

(1) the value of "+1" is recorded in sequence 315 for each data point at which the time series of the closing price of the market instrument is at a peak point;

(2) the value of "−1" is recorded in sequence 315 for each data point at which the time series of the closing price of the market instrument is at a trough point;

(3) the value of "0" is recorded in sequence 315 for each other data point.

Thereafter, a convolution function is applied to sequence of values 315 to "smooth" it into sequence of values 318. Smoothing sequence of values 315 may be performed according to the following rules:

(a) a real number value between "0" and "+1" is recorded in sequence 318 for each data point at which the time series of the closing price of the market instrument leads up to a peak point;

(b) a real number value between "+1" and "0" is recorded in sequence 318 for each data point at which the time series of the closing price of the market instrument leads down from a peak point;
(c) a real number value between "0" and "−1" is recorded in sequence 318 for each data point at which the time series of the closing price of the market instrument leads down to a trough point;
(d) a real number value between "−1" and "0" is recorded in sequence 318 for each data point at which the time series of the closing price of the market instrument leads up from a trough point.

The sequence 318 can then be used in the computation of a similarity score.

Using the mapping technique illustrated in FIG. 3B, the similarity determining logic may determine a primary array and candidate array, where the primary array maps the peaks/troughs feature set of a primary instrument and the candidate array maps the peaks/troughs feature set of the candidate array. The corresponding values in the primary array and the candidate array are multiplied, and the resulting products are then averaged. The result of the averaging operation is a similarity score that reflects the degree of relationship between the primary array and the candidate array.

In an example embodiment, the computed similarity score would be a real number value between "−1" and "+1". A value close to "−1" would indicate that the primary instrument and the candidate instrument are inversely correlated. For example, on most days on which the primary instrument exhibits a peak, the candidate instrument would tend to be at or close to a trough. A value close to "0" indicates that the primary instrument and the candidate instrument are not correlated. A value close to "+1" would indicate that the primary instrument and the candidate instrument are positively correlated. For example, on most days on which the primary instrument exhibits a peak, the candidate instrument would also tend to be at or close to a peak.

The mapping technique illustrated in FIG. 3B is not limited to using any particular range of real number values. Accordingly, the specific details of the technique illustrated in FIG. 3B are to be regarded in an illustrative rather than a restrictive sense.

The mapping technique illustrated in FIG. 3B is not limited to being implemented only for a peaks/troughs feature set. For example, a feature set computer may use this mapping technique to map the time series of other instrument metrics including, but not limited to, the relative strength index (RSI) of a market instrument, the volatility (implied and/or historical) of a market instrument, and the market capitalization of a market instrument.

Further, a similarity determining logic may use the mapping technique illustrated in FIG. 3B to map other instrument features, for example, a Tom DeMark (TD) sequential indicator. The TD sequential indicator is a measure of market saturation that is used to predict up and down trends. For example, the TD sequential indicator may be used by traders to identify days on which to sell and days on which the buy. Accordingly, the mapping technique illustrated in FIG. 3B is to be regarded in an illustrative rather than a restrictive sense.

V. Example Graphical User Interface

Figure 4A:
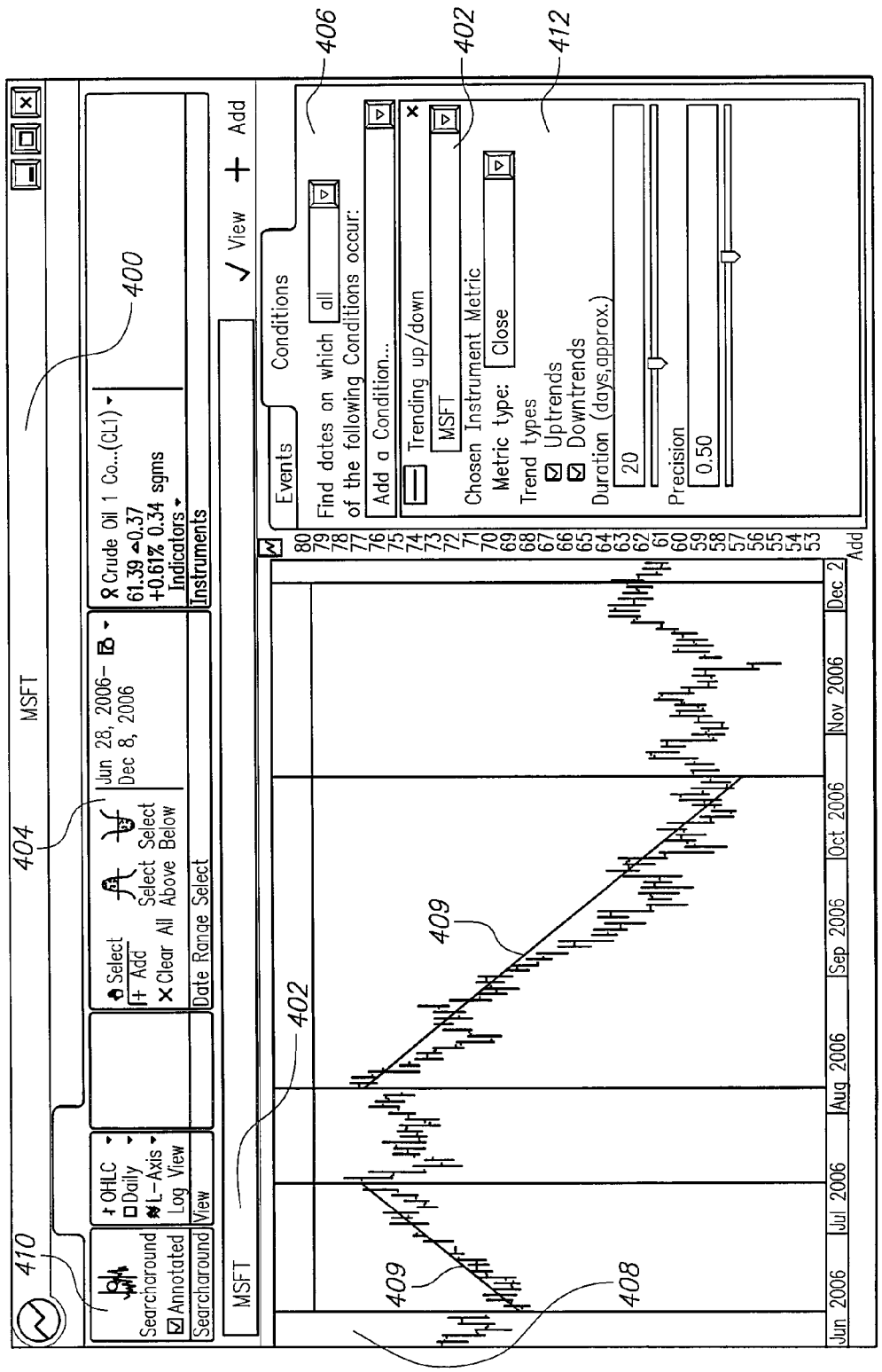
FIGS. 4A and 4B illustrate example graphical user interfaces.
Figure 4B:
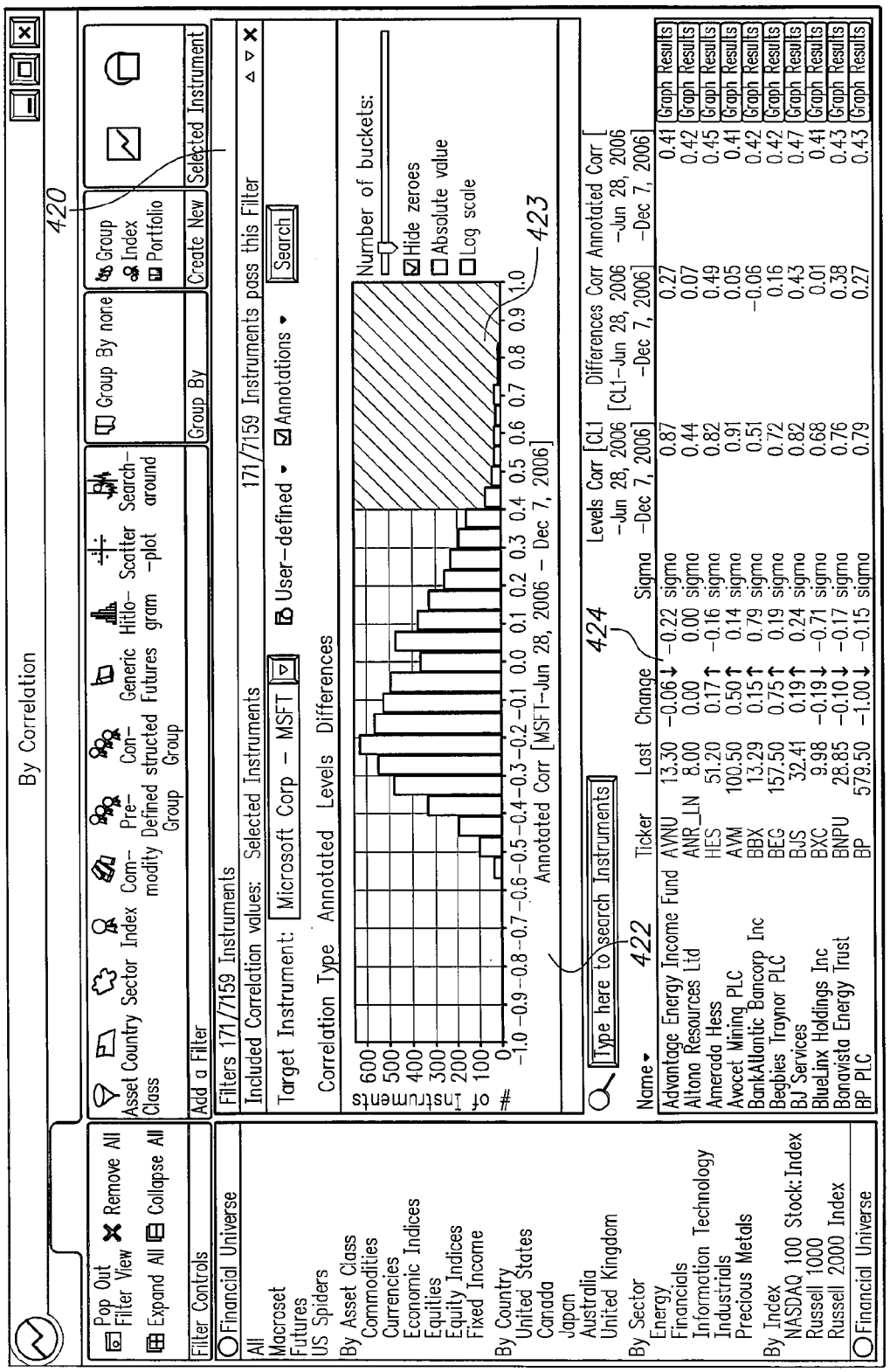

FIGS. 4A and 4B illustrate examples of a graphical user interface that may be used to receive user input and to display similarity scores computed according to the techniques described herein. In an example embodiment, the graphical user interface may be implemented as a set of program instructions which, when executed by one or more processors, are operable to render the graphical user interface on the display of a computer system. In some embodiments, the set of program instructions operable to generate the graphical user interface may be included in a standalone application, which is also operable to perform the techniques described herein for feature-based correlation of market instruments. In some embodiments, the set of program instructions operable to generate the graphical user interface may be included in a client component of a client-server application, where the server component of the client-server application is operable to compute similarity scores according to the techniques described herein. In some embodiments, the set of program instructions operable to generate the graphical user interface may be included in a server or service, where the server or service is operable to communicate instructions for rendering the graphical user interface to a client that is operable to display the graphical user interface to a user.

FIG. 4A illustrates graphical user interface 400. Graphical user interface 400 comprises a plurality of GUI components and content panes 406 and 408. As used herein, "content pane" refers to a graphical representation object that is configurable to include one or more GUI components. Content panes may be included in frames. A "frame" refers to a graphical representation object that is configurable to include one or more content panes and/or GUI components. Examples of frames include, but are not limited to, dialog boxes, forms, and various other types of window containers.

The plurality of GUI components in graphical user interface 400 includes GUI component 402 that is configured to receive user input specifying a primary market instrument. As illustrated in FIG. 4A, GUI component 402 may be a text field configured to receive text input from a user, or a drop-down box configured to receive text input and/or a selection input that indicates the primary market instrument. In some embodiments, GUI component 402 may be provided within a content pane, such as, for example, content pane 406.

The plurality of GUI components in graphical user interface 400 also includes one or more GUI components 404 that are configured to receive user input specifying a date range of a time series of the primary instrument, within which date range a user would like to look for particular time series features. GUI components 404 may comprise a pair of text fields configured to receive a start date and an end date as text input from a user. In some embodiments, GUI components 404 may include a calendar GUI component that is configured to receive user input that selects the start date and the end date from a calendar pane.

The plurality of GUI components in graphical user interface 400 includes one or more GUI components 410 that are configured to receive user input in response to which feature-based similarity scores with respect to the primary instrument are computed. For example, GUI components 410 may include a button. In some embodiments, GUI components 410 may be provided within a content pane of graphical user interface 400.

Content pane 406 comprises one or more panels, where each panel includes GUI components configured to receive input identifying a specific feature set computer and the values of zero or more parameters of that specific feature set computer. As used herein, "panel" refers to a graphical representation object which can be included in a content pane and which is configurable to include one or more GUI components. Examples of GUI components include, but are not limited to, buttons of various types, check boxes, combo boxes, labels, lists, progress bars, scroll bars, sliders, status bars, tables, tabs, text fields, trees, and toolbars.

Content pane 408 comprises a chart on which time series associated with a primary instrument (or with any metrics thereof) may be plotted. In the example embodiment illustrated in FIG. 4A, the horizontal axis of the chart is a time axis and the vertical axis of the chart reflects the magnitude of the data values included in the time series. A time series may be plotted on the chart as an unbroken line. Other examples of graphical representations for a time series include, but are not limited to, OHLC bars and candle bars.

In the operational example illustrated in FIG. 4A, suppose that a user wants to determine the similarity scores between the closing price of the Microsoft Corp. stock (ticker "MSFT") and a plurality of other market instruments based on a trending feature. The user may enter in GUI components 404 the start date "Jun. 28, 2006" and the end date "Dec. 8, 2006", which identify a time period of interest to the user. In some embodiments, the user may specify through GUI components multiple non-overlapping time periods of interest. The user also enters the "MSFT" ticker in GUI component 402 as the primary instrument with respect to which the similarity scores are to be determined. Next, the user selects an indicator for a trending feature set computer from a drop-down box included in panel 406. In response to the user selection, panel 412 is displayed in content pane 406. The user then selects, from a drop-down box included in panel 412, the closing price as the metric with respect to which the trends of the "MSFT" primary instrument are going to be determined. The user then enters the duration parameter value "20" and the precision parameter value "0.50" in text boxes included in panel 412. (The user may also enter these parameters by using a set of corresponding sliders.)

In response to receiving the duration and/or the precision parameter values from the user, a time series that comprises the values of the closing price of the "MSFT" primary instrument is retrieved from a data repository or is generated based on values retrieved from the data repository. The time series is filtered to include only values associated with timestamps between the start date and the end date specified in GUI components 404. The time series is then plotted as OHLC bars on the chart in content pane 408. Based on the duration and precision values specified by the user, a trending feature set computer determines from the filtered time series the primary trending feature set existing for the "MSFT" primary instrument between the start date and the end date. As illustrated in FIG. 4A, an up-trend and a down-trend are determined for the closing price of the "MSFT" primary instrument, and these trends are displayed as sloping trend lines 409 on the chart in content pane 408. The user may then adjust the duration and precision parameter values in panel 412 in order to determine the exact trends that the user is interested in for the closing price of the "MSFT" primary instrument. In response, the trending feature set computer re-computes the trends for the closing price of the primary instrument, and the re-computed trends are re-displayed on the chart in content pane 408.

When the user determines the exact trends that he or she is interested in, the user may enter input in GUI components 410 in order to search for other instruments that may be correlated to the "MSFT" primary instrument based on the specified trending feature. In response to receiving the user input in GUI components 410, the techniques described herein are performed to determine the similarity scores associated with a plurality of candidate instruments. The plurality of candidate instruments may be specified by the user or may be automatically determined based on some criteria specified by the user.

According to the techniques described herein, a time series for each particular candidate instrument is retrieved from a data repository or is generated based on data values retrieved from the data repository. The time series is filtered to include only values that are associated with timestamps between the start date and the end date specified by the user in GUI components 404. Based on the filtered time series, the trending feature set computer determines a candidate trending feature set for the particular candidate instrument based on the parameter values specified by the user in panel 412. The candidate trending feature set is then correlated to the primary trending feature set for the "MSFT" primary instrument, and a similarity score associated with the particular candidate instrument is computed and stored in computer data storage.

After a similarity score is determined in the above manner for each candidate instrument in the plurality of candidate instruments, results including the computed similarity scores are displayed to the user. FIG. 4B illustrates an example graphical interface in which the results may be displayed.

The graphical user interface in FIG. 4B comprises content pane 420. Content pane 420 comprises histogram 422 and table 424, both of which display the same results but in different format. In FIG. 4B, a histogram and a table are used to display the results. However, the techniques described herein are not limited to displaying results in any particular format, and for this reason the display formats of FIG. 4B are to be regarded in an illustrative rather than a restrictive sense.

The horizontal axis of histogram 422 reflects the similarity score values from "−1" to "+1" in increments that are rounded to the nearest "0.1". The vertical axis of histogram 422 reflects a number of candidate instruments. Histogram 422 depicts the correlation results as vertical bars, where the height of each vertical bar reflects the number of all candidate instruments that have similarity scores within the particular "0.1" value range associated with that vertical bar. Thus, the vertical bars that reflect candidate instruments that are not correlated to the "MSFT" primary instrument are depicted in the middle of histogram 422, the vertical bars that reflect candidate instruments that are negatively correlated to the primary instrument are depicted at the left end of the histogram, and the vertical bars that reflect candidate instruments that are positively correlated to the primary instrument are depicted at the right end of the histogram. For example, region 423 illustrates the vertical bars that reflect candidate instruments associated with similarity scores greater than "+0.4".

Table 424 comprises one row for each candidate instrument. Each row comprises a field that stores a value indicating a particular candidate instrument (e.g. an instrument ticker) and a field that stores the similarity score computed for that particular candidate instrument. As a visual aid to the user, in some embodiments similarity scores that are negative may be displayed in one color (e.g. in red) and similarity scores that are positive may be displayed in a different color (e.g. green).

VI. Example Implementation Hardware

Figure 5:
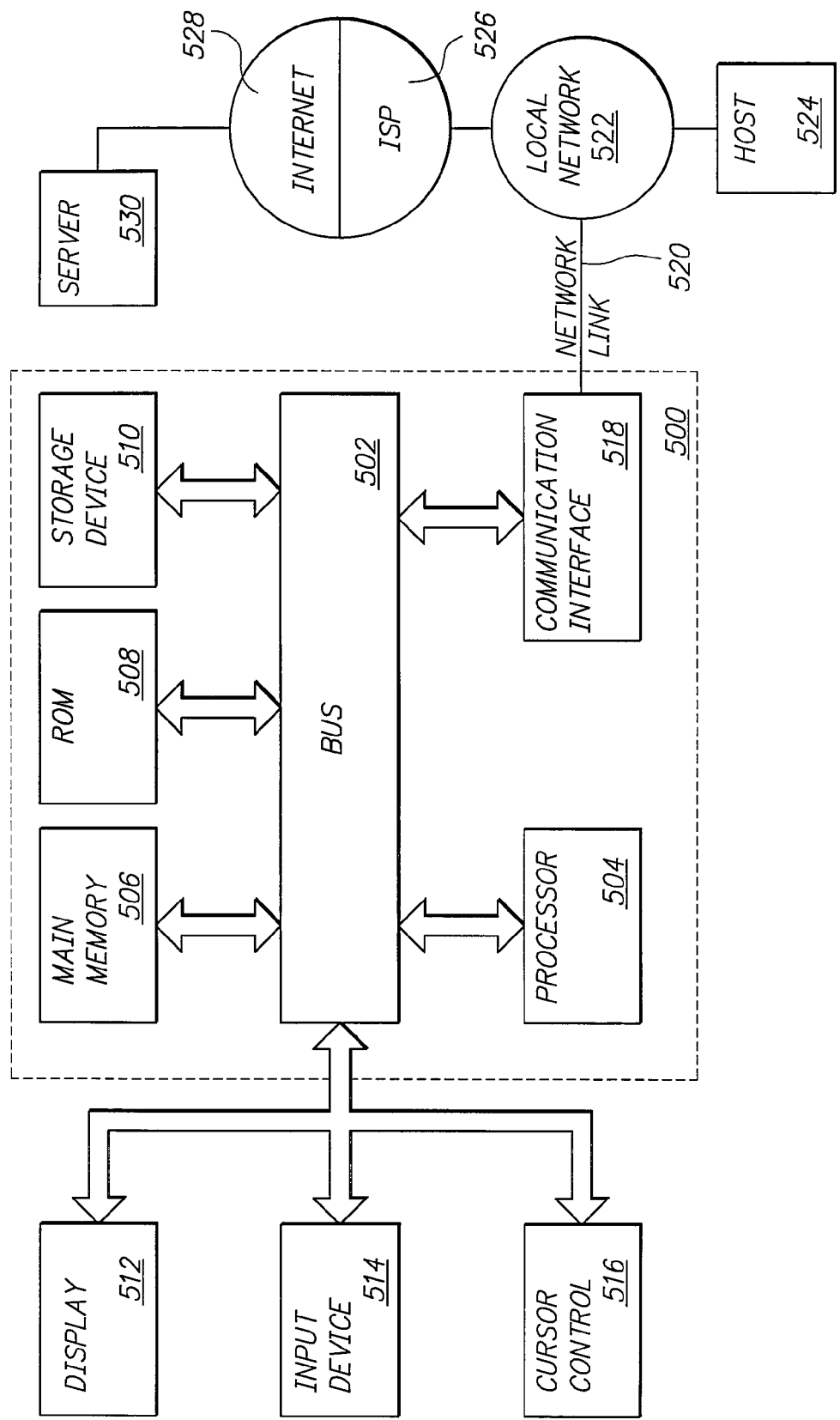
FIG. 5 illustrates a computer system with which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
 receiving first input that specifies a first market instrument;
 receiving second input that specifies a start date and an end date of a first time series associated with the first market instrument;

receiving third input that specifies a feature set computer and the values of one or more parameters of the feature set computer, that define a particular time series feature;

retrieving the first time series from a data repository;

determining a first feature set associated with the first market instrument by applying the feature set computer to the first time series based on the values of the one or more parameters, wherein the first feature set includes first one or more features that existed for the first market instrument between the start date and the end date;

wherein the feature set computer applied to the first time series comprises a set of instructions which, when executed by one or more processors, computes each of the first one or more features based on the values of the one or more parameters as a first set of data that represents one or more characteristics of the first time series;

retrieving, from the data repository, a second time series associated with a second market instrument, wherein the second time series is bounded by the start date and the end date;

determining a second feature set associated with the second market instrument by applying the feature set computer to the second time series based on the values of the one or more parameters, wherein the second feature set includes second one or more features that existed for the second market instrument between the start date and the end date;

wherein the feature set computer applied to the second time series comprises the set of instructions which, when executed by the one or more processors, computes each of the second one or more features based on the values of the one or more parameters as a second set of data that represents one or more characteristics of the second time series;

correlating the second feature set to the first feature set to determine a similarity score associated with the second market instrument, wherein the similarity score is a measure of the similarity between the one or more characteristics of the second time series of the second market instrument and the one or more characteristics of the first time series of the first market instrument; and storing the similarity score in computer data storage;

wherein the method is performed by one or more computer systems;

wherein correlating the second feature set to the first feature set comprises: determining a first array of values that represents the first feature set, wherein each value in the first array is a real number value within a range of values; determining a second array of values that represents the second feature set, wherein each value in the second array is a real number value within the range of values; and determining the similarity score based on the first array of values and the second array of values;

wherein: the first one or more features in the first feature set and the second one or more features in the second feature set are peaks/troughs features; and the range of values is bounded by the values of "−1" and "+1", wherein in the first array of values and in the second array of values: a trough point is mapped to an array value of "−1"; feature points leading to a trough point on either side are mapped to array values between the values of "0" and "−1"; a peak point is mapped to an array value of "+1"; and feature points leading to a peak point on either side are mapped to array values between the values of "0" and "+1".

2. The method of claim 1, wherein:

the first time series is a first collection of pairs of timestamps and data values for a first metric of the first market instrument; and the second time series is a second collection of pairs of timestamps and data values for a second metric of the second market instrument.

3. The method of claim 1, further comprising:

in response to receiving the first input, the second input, and the third input, causing the first feature set to be displayed as an annotation overlaid on a graphical representation of the first time series in a graphical user interface.

4. The method of claim 1, wherein the second market instrument is included in a plurality of market instruments, and wherein the method further comprises:

determining a plurality of feature sets respectively associated with the plurality of market instruments by applying, based on the values of the one or more parameters, the feature set computer to a plurality of time series respectively associated with the plurality of market instruments, wherein the plurality of feature sets include features that existed for the plurality of market instruments between the start date and the end date; and correlating the plurality of feature sets to the first feature set to determine a plurality of similarity scores respectively associated with the plurality of market instruments.

5. The method of claim 4, further comprising:

generating a histogram that groups the plurality of market instruments based on the plurality of similarity scores; and causing the histogram to be displayed in a graphical user interface.

6. The method of claim 4, further comprising:

generating a table that includes each of the plurality of market instruments in association with a corresponding similarity score of the plurality of similarity scores; and causing the table to be displayed in a graphical user interface.

7. The method of claim 1, wherein correlating the second feature set to the first feature set comprises:

determining a first array of values that represents the first feature set, wherein each value in the first array is an integer value from a set of integer values;

determining a second array of values that represents the second feature set, wherein each value in the second array is an integer value from the set of integer values; and determining the similarity score based on the first array of values and the second array of values.

8. The method of claim 7, wherein:

the first one or more features in the first feature set and the second one or more features in the second feature set are trending features; and the set of integer values includes the values of "−1", "0", and "+1", wherein in the first array of values and in the second array of values:

feature points of a trend-down feature are mapped to array values of "−1";

feature points of a no-trend feature are mapped to array values of "0"; and feature points of a trend-up feature are mapped to array values of "+1".

9. A machine-readable volatile or non-volatile storage medium comprising one or more program instructions recorded thereon, which instructions, when executed by one or more processors, cause:

receiving first input that specifies a first market instrument;
receiving second input that specifies a start date and an end date of a first time series associated with the first market instrument;
receiving third input that specifies a feature set computer and the values of one or more parameters of the feature set computer, that define a particular time series feature;
retrieving the first time series from a data repository;
determining a first feature set associated with the first market instrument by applying the feature set computer to the first time series based on the values of the one or more parameters, wherein the first feature set includes first one or more features that existed for the first market instrument between the start date and the end date;
wherein the feature set computer applied to the first time series comprises a set of instructions which, when executed by one or more processors, computes each of the first one or more features based on the values of the one or more parameters as a first set of data that represents one or more characteristics of the first time series;
retrieving, from the data repository, a second time series associated with a second market instrument, wherein the second time series is bounded by the start date and the end date;
determining a second feature set associated with the second market instrument by applying the feature set computer to the second time series based on the values of the one or more parameters, wherein the second feature set includes second one or more features that existed for the second market instrument between the start date and the end date;
wherein the feature set computer applied to the second time series comprises the set of instructions which, when executed by the one or more processors, computes each of the second one or more features based on the values of the one or more parameters as a second set of data that represents one or more characteristics of the second time series;
correlating the second feature set to the first feature set to determine a similarity score associated with the second market instrument, wherein the similarity score is a measure of the similarity between the one or more characteristics of the second time series of the second market instrument and the one or more characteristics of the first time series of the first market instrument;
storing the similarity score in computer data storage;
wherein the instructions that cause correlating the second feature set to the first feature set further comprise instructions which, when executed by the one or more processors, cause: determining a first array of values that represents the first feature set, wherein each value in the first array is a real number value within a range of values;
determining a second array of values that represents the second feature set, wherein each value in the second array is a real number value within the range of values; and determining the similarity score based on the first array of values and the second array of values;
wherein: the first one or more features in the first feature set and the second one or more features in the second feature set are peaks/troughs features; and the range of values is bounded by the values of "−1" and "+1", wherein in the first array of values and in the second array of values: a trough point is mapped to an array value of "−1"; feature points leading to a trough point on either side are mapped to array values between the values of "0" and "−1"; a peak point is mapped to an array value of "+1"; and feature points leading to a peak point on either side are mapped to array values between the values of "0" and "+1".

10. The machine-readable volatile or non-volatile storage medium of claim 9, wherein:
the first time series is a first collection of pairs of timestamps and data values for a first metric of the first market instrument; and
the second time series is a second collection of pairs of timestamps and data values for a second metric of the second market instrument.

11. The machine-readable volatile or non-volatile storage medium of claim 9, wherein the one or more program instructions further comprise instructions which, when executed by the one or more processors, cause:
in response to receiving the first input, the second input, and the third input, causing the first feature set to be displayed as an annotation overlaid on a graphical representation of the first time series in a graphical user interface.

12. The machine-readable volatile or non-volatile storage medium of claim 9, wherein the second market instrument is included in a plurality of market instruments, and wherein the one or more program instructions further comprise instructions which, when executed by the one or more processors, cause:
determining a plurality of feature sets respectively associated with the plurality of market instruments by applying, based on the values of the one or more parameters, the feature set computer to a plurality of time series respectively associated with the plurality of market instruments, wherein the plurality of feature sets include features that existed for the plurality of market instruments between the start date and the end date; and
correlating the plurality of feature sets to the first feature set to determine a plurality of similarity scores respectively associated with the plurality of market instruments.

13. The machine-readable volatile or non-volatile storage medium of claim 12, wherein the one or more program instructions further comprise instructions which, when executed by the one or more processors, cause:
generating a histogram that groups the plurality of market instruments based on the plurality of similarity scores; and
causing the histogram to be displayed in a graphical user interface.

14. The machine-readable volatile or non-volatile storage medium of claim 12, wherein the one or more program instructions further comprise instructions which, when executed by the one or more processors, cause:
generating a table that includes each of the plurality of market instruments in association with a corresponding similarity score of the plurality of similarity scores; and
causing the table to be displayed in a graphical user interface.

15. The machine-readable volatile or non-volatile storage medium of claim 9, wherein the instructions that cause correlating the second feature set to the first feature set further comprise instructions which, when executed by the one or more processors, cause:
determining a first array of values that represents the first feature set, wherein each value in the first array is an integer value from a set of integer values;
determining a second array of values that represents the second feature set, wherein each value in the second array is an integer value from the set of integer values; and determining the similarity score based on the first array of values and the second array of values.

16. The machine-readable volatile or non-volatile storage medium of claim 15, wherein:
the first one or more features in the first feature set and the second one or more features in the second feature set are trending features; and
the set of integer values includes the values of "−1", "0", and "+1", wherein in the first array of values and in the second array of values:
feature points of a trend-down feature are mapped to array values of "−1";
feature points of a no-trend feature are mapped to array values of "0"; and
feature points of a trend-up feature are mapped to array values of "+1".

* * * * *